May 3, 1960 M. A. GRIBIN ET AL 2,934,963

REMOTE CONTROL DEVICE

Filed May 2, 1955

INVENTOR.
MURRAY A. GRIBIN
ALFRED C. OECHSLE
BY C. G. Stratton
ATTORNEY

United States Patent Office 2,934,963

Patented May 3, 1960

2,934,963

REMOTE CONTROL DEVICE

Murray A. Gribin, Van Nuys, and Alfred C. Oechsle, North Hollywood, Calif., assignors, by mesne assignments, to The Alliance Manufacturing Company, Division of Consolidated Electronics Industries Corporation, Alliance, Ohio, a corporation of Delaware Application May 2, 1955, Serial No. 505,224

5 Claims. (Cl. 74—10)

This invention relates to a remote control device particularly for operating the tuner of a television receiver, but is readily applicable to operate other rotational controls, such as "on and off" switches, clarity and volume controls, etc., whether on television receivers or other electronic devices.

An object of the present invention is to provide a remote control device that is of such simple design as to be readily installed by even an unskilled person and without the need of tools.

Another object of the invention is to provide a remote control device that embodies novel and improved means insuring proper operative position of the device on a television receiver or other electronic machine.

The invention also has for its objectis to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes one embodiment of the present invention, which is given by way of illustration or example only.

In the drawing, like reference characters designate similar parts in the several views.

The television receiver 10 has the usual operating shaft 11 of a tuner, the same extending from the face of the receiver substantially as shown. Such shaft, in the usual manner, is cut or otherwise formed as at 12 to be noncylindrical. In this case, the shaft portion 12 is shown as provided with a flat. It will be understood that shaft 11 may be the controller of a switch, rheostat, clarity control, etc., providing such shaft is rotational. Also, the receiver 10 is intended as typical of electronic devices. In other words, the present control means is applicable to a rotationally movable shaft of an electronic machine.

Figures 3, 4:
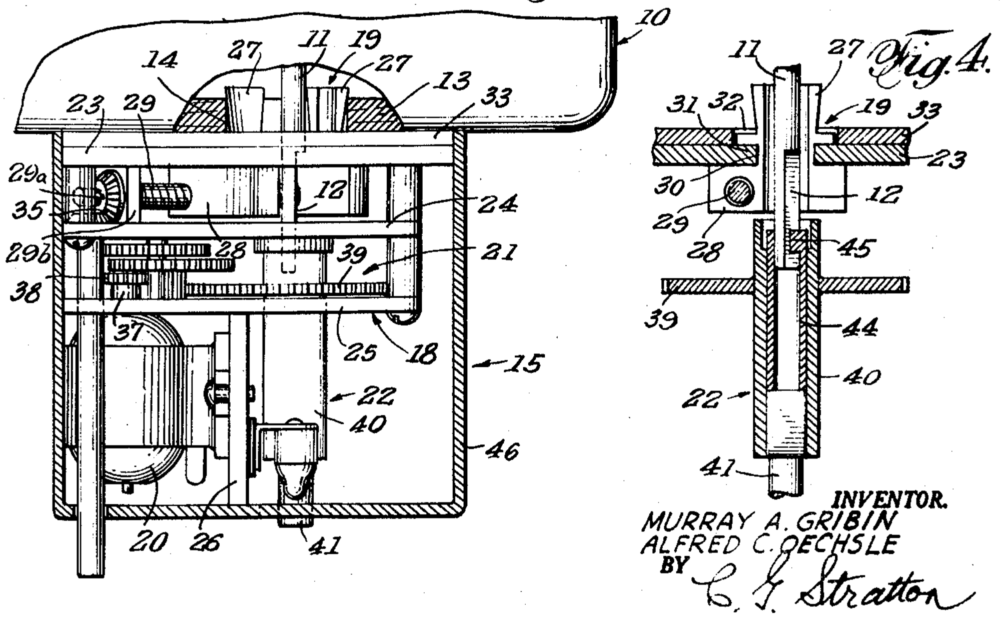
Fig. 3 is a plan view, partly in cross-section of the unit shown in Fig. 2.
Fig. 4 is a longitudinal sectional view of drive coupling means used in said unit.

As seen best in Fig. 3, such a machine has a wall 13, with a hole 14 through which shaft 11 extends and it is to this wall that the present apparatus is adapted to be attached. It is here noted that hole 14 is not always concentric with shaft 11, any lack of concentricity there may be resulting from variations in the fitting of the cabinet or housing of the machine with respect to the components of the chassis of said machine.

The present control device comprises a drive unit 15 that is mounted on the machine 10, as indicated above, a switch and power unit 16 remote from unit 15, and an electrical connection 17 between said units.

The drive unit 15 comprises generally, a chassis 18, mounting means 19 to attach said chassis to the receiver 10, a prime mover 20, a gear train 21 controlled by the prime mover, and a shaft-coupling unit 22 driven by the output of the gear train and adapted to telescopically connect with the flat-provided end of operating shaft 11.

The chassis 18 may be variously formed. As shown, the same has a base plate 23 that is adapted to be placed in flatwise engagement with the outer face of wall 13 of set 10, a plate 24 spaced from plate 23 and together with the latter, housing part of the mounting means 19, a plate 25 spaced from plate 24 and, together with the latter, housing the gear train 21, and a mounting plate 26 for the prime mover and carried by plate 25.

The unit attaching or mounting means 19 is shown as comprising a pair of similar half-collets 27 that are formed as parts of nuts 28, the latter being engaged with right and left hand threaded portions of a screw 29. Said half-collects 27 are each formed with a notch or recess 30 that has guiding engagement with the opposite edges 31 defining an elongated opening 32 in plate 23.

By reason of the opposite threads on screw 29, rotation thereof in one direction will move the half-collets apart, and rotation in the opposite direction will move them toward each other. Said half-collets, as seen in Figs. 3 and 4, are conically tapered, from their outer ends toward the nuts 28 and project beyond the outer face of plate 23 and also beyond a liner plate 33 that may be provided. Thus, with the half-collets together and surrounding shaft 11, they may be introduced into hole 14. Then, by turning screw 29 in a direction to move the half-collets apart, they may be brought into opposed gripping engagement with the wall of said hole and by reason of the conical taper, be drawn inwardly to bring the liner wall 33 into flatwise contact with the outer face of said wall 13. As an aid to such gripping by the half-collets, the outer conical faces therof may be provided with roughening notches or the like 34.

Assuming the half-collets to have a substantially central position with respect to the chassis, it is preferred to provide a control for said means 19 at a corner thereof. Thus, the guide edges 31 for the half-collets are arranged at an angle so that screw 29 may have a similar angle. By providing a bevel gear or similar drive 35 for said screw and a knob 36 for said drive, manipulation of said knob will readily operate the means 19 to attach or release the unit 15, as desired.

Figure 1:
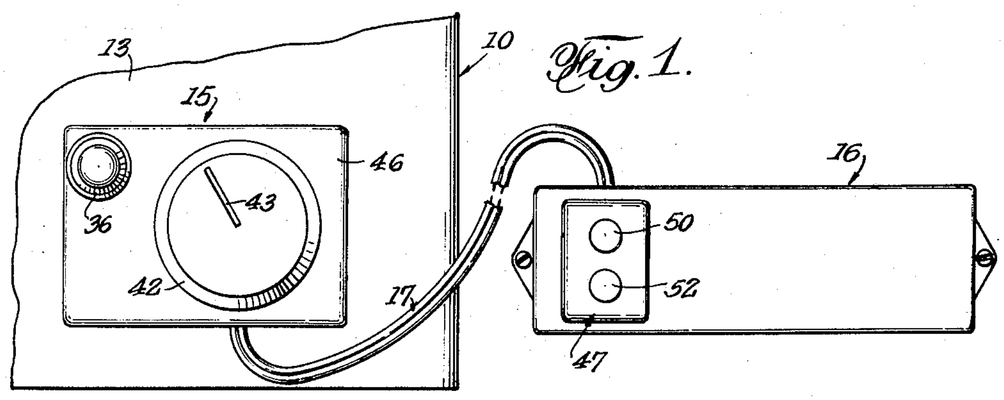
Fig. 1 is a front elevational view of remote control apparatus according to the present invention, the same being shown in operative position.
Figures 2, 5:
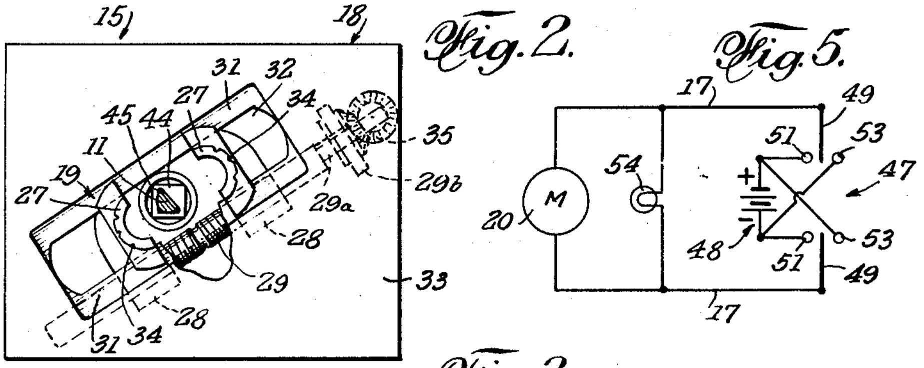
Fig. 2 is a rear elevational view of the unit of said apparatus that is mounted on a television receiver or like machine.
Fig. 5 is a wiring diagram of the electrical connections of said apparatus.

Screw 29 has an unthreaded end 29*a* that extends through a bearing wall 29*b* and has sliding but keyed connection with one of the gears of the bevel gear drive 35. Consequently, said screw may shift endwise as the half-collets 27 center on hole 14. Thus, as indicated in Fig. 2, the means 19 may assume an eccentric position with respect to shaft 11 if hole 14 is eccentric. In other words, the unit 15 will center on shaft 11, but the means 19 will shift to an eccentric position to suit the location of hole 14.

By providing knob 36 at the front, ready access thereto may be had. By omitting gears 35 and placing such a knob directly on an end of screw 29, a similar control is effected except that the knob is at the side of unit 15 rather than at the front, as shown.

The prime mover 20 is shown as a miniature motor, the same being of the direct current reversing type. Said motor is so mounted on wall 26 that its output shaft 37 is directed into the space between chassis walls 24 and 25.

The gear train 21 is typical of speed-reduction gear boxes, having an input gear 38 on the motor shaft 37 and an output gear 39. The latter is affixed, as shown, to the shaft-coupling unit 22.

The coupling unit preferably comprises a polygonal-sectioned shaft 40 that has rotational bearing in chassis walls 24 and 25 and is provided with an extension 41 that is adapted to carry a knob 42 having tell-tale means 43 that reveals the angular setting of said knob. Said unit 22 further includes an auxiliary polygonal-sectioned member 44 that is telescopically fitted into shaft 40 (see Fig. 4) and has an end 45 adapted for driven connection with the flat portion 12 of shaft 11.

While shafts 40 and 11 may be directly coupled, the member 44 provides a means that enables coupling of shaft 11 to the present device regardless of variations in the non-cylindrical form of said shaft 11.

The chassis may be provided with a housing 46 substantially as shown.

The switch and power unit 16 is made of a size that can be held in the hand and in this case is designed not only to carry switch means 47 but also dry cell batteries 48 as a source of power for energizing motor 20.

The switch means 47 is of the reversing type so that the polarity of the current sent to the motor may be reversed as desired. When both switch arms 49 are moved as by button 50 to engage contacts 51, current to motor 20, in one direction, is produced. When said switch arms 49 are moved by button 52 to engage contacts 53, current to motor 20, in the opposite direction, is produced.

Thus, by proper manipulation of switch buttons 50 and 52, the shaft 11 can be driven in one direction or the other to achieve an angular setting of said shaft, as desired. Since conventional tuners are provided with detent-held positions, extreme accuracy of the setting is effected.

The simple two line connection 17 may be as long as needed so that a person may sit remote from the receiver 10 and having control of unit 16 may tune said receiver or, as above indicated, control any rotating device of an electronic machine in a similar manner.

It may be desired to render knob 42 or, at least, its tell-tale means 43 visual in a darkened environment. To this end a light bulb 54 may be connected across motor 20, or in any other suitable way so as to illuminate such means 43, at least when the unit 15 is operating.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what is claimed and desired to be secured by Letters Patent is:

1. A remote control device adapted to connect to a housing wall of a machine and to control rotation of an operating shaft projecting through an opening in such wall, said device comprising a unit embodying a driven member adapted for telescopic driving connection with the shaft of the machine, and mounting means carried by said unit in shifting relation to the center of said driven member, said means being adapted to engage the wall of said opening and, thereby, mount the device in shaft controlling position.

2. A remote control device adapted to connect to a housing wall of a machine and to control rotation of an operating shaft projecting through an opening in such wall, said device comprising a unit embodying a driven member adapted for telescopic driving connection with the shaft of the machine, and collet means comprising collet elements on opposite sides of the center of the shaft, said collet elements extending outwardly from the control device and adapted to engage the wall of said opening and, thereby, mount the device in shaft-controlling position.

3. A remote control device according to claim 2: said collet elements being conically tapered in a direction to draw the device into flatwise engagement with said wall of the machine.

4. A remote control device according to claim 2: said collet elements being conically tapered in a direction to draw the device into flatwise engagement with said wall of the machine, a screw interconnecting said collect elements, and a knob disposed outside of the device and connected to said screw to adjust said collet elements.

5. A remote control device provided with shaft-rotating means, mounting means for said device, said mounting means being adjustable in respect to the axis of the shaft-rotating means and comprising a right and left hand threaded shaft, a second shaft having an angular relation in respect to said threaded shaft, gear means interconnecting said threaded shaft and said second shaft, a pair of similar and oppositely formed mounting members carried by the threaded shaft, one of said members engaging the right hand threaded portion of said shaft and the other of said members engaging the left hand threaded portion of said shaft, and means to rotate the second shaft and thereby move said mounting members relatively.

References Cited in the file of this patent

UNITED STATES PATENTS

| | | |
|---|---|---|
| 1,868,587 | Richards | July 26, 1932 |
| 1,965,669 | Robb | July 10, 1934 |
| 1,969,687 | Brown | Aug. 7, 1934 |
| 2,187,272 | Kochner | Jan. 16, 1940 |
| 2,422,773 | Colwill | June 24, 1947 |
| 2,740,907 | Dennenmann | Apr. 3, 1956 |